(No Model.)
C. H. PARSHALL, Jr.
LUBRICATOR.
No. 283,017. Patented Aug. 14, 1883.
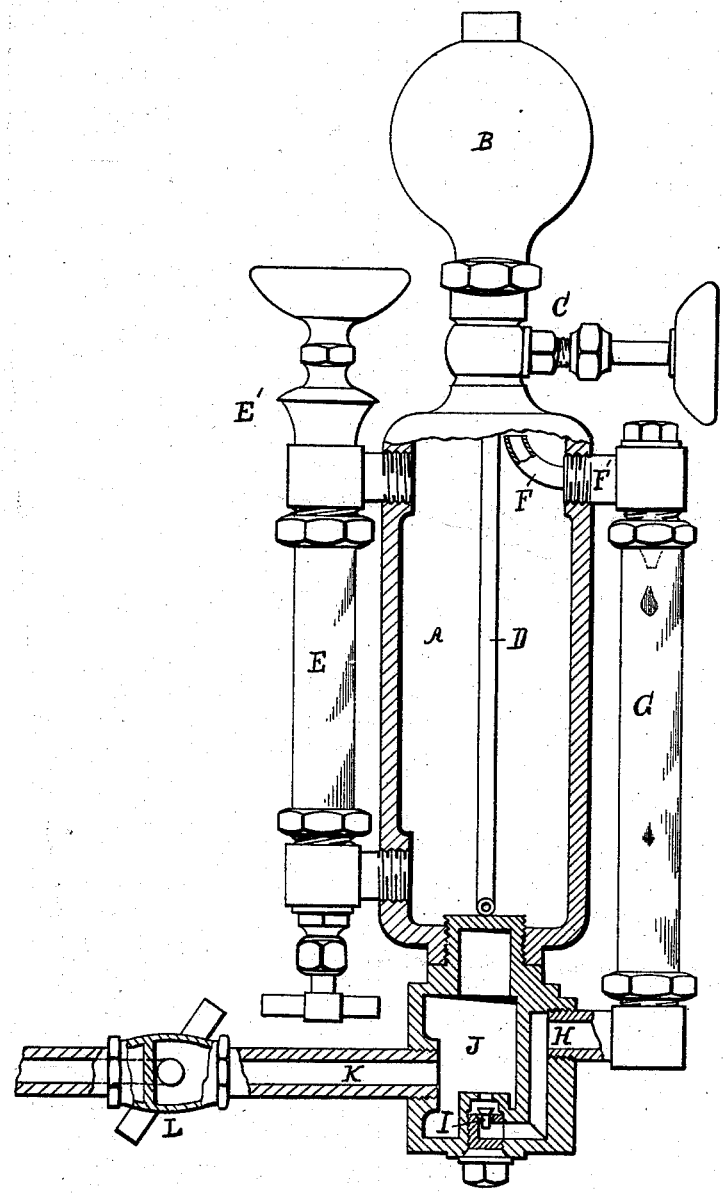
WITNESSES
Samuel E. Thomas
N. S. Wright
INVENTOR
Charles H. Parshall Jr.
By W. W. Leggett
Attorney

UNITED STATES PATENT OFFICE.

CHARLES H. PARSHALL, JR., OF DETROIT, MICHIGAN.

LUBRICATOR.

SPECIFICATION forming part of Letters Patent No. 283,017, dated August 14, 1883.

Application filed January 4, 1883. (No model.)

*To all whom it may concern:*

Be it known that I, CHARLES H. PARSHALL, Jr., of Detroit, county of Wayne, State of Michigan, have invented a new and useful Improvement in Lubricators; and I declare the following to be a full, clear, and exact description of the same, such as will enable others skilled in the art to which it pertains to make and use it, reference being had to the accompanying drawing, which forms a part of this specification.

My invention consists in the combinations of devices and appliances hereinafter specified, and more particularly pointed out in the claims.

The figure on the drawing represents a longitudinal central section of a lubricator illustrating my invention.

It is the object of my invention to produce a lubricator in which the feed of oil is indicated by drops of oil falling through a chamber inclosing an air or vapor space, and in the means for making such a lubricator effective.

Heretofore where lubricators of this type have been employed difficulty has been experienced from the clouding of the interior of the glass chamber by the accumulation of vapor therein, or from water of condensation collecting upon the interior of the glass tube.

In carrying out my invention I purpose to so construct the device that the transparent chamber shall be filled with dead air, and so be kept clear and bright.

A represents the oil-reservoir; B, a condensing-chamber above the same, which chamber is designed to be connected by a pipe or other conduit which will feed the steam into it from the steam-pipe or other source.

C is a valve governing the flow of condensed water through the pipe D into the bottom of chamber A, although it is not absolutely essential, though preferable, that the pipe D should feed to the bottom of the chamber A, since it might terminate at any point between the top and the bottom.

E represents the ordinary indicator-tube, for showing the relative height of oil and water within the reservoir.

F is an oil-exit pipe, leading from the top of the reservoir A into and discharging oil through a nipple, F', at the top of the transparent chamber or glass tube G. It passes thence through the conduit H and through the check-valve I into the chamber J, and thence through the passage K and the valve L to the parts to be lubricated.

It will be observed that the check-valve is beneath the level of condensed water which will collect within the chamber J, and that it would thus afford a complete check against vapor passing back through this valve into the chamber G.

It will also be observed that the pipe F leads from the top of the oil-reservoir, so that when the reservoir is filled nearly full with oil through the feeder E', it will confine a certain volume of air above the oil. Now, as the condensed water is fed into the reservoir through the valve C, the oil, in rising, will force this air out through the tube F and the nipple F', and cause it to fill the chamber or tube G with air. The presence of air within this tube would naturally prevent the accumulation of vapor within the same space.

I have found in practical operation of this device that the glass tube G will remain perfectly clear, and that the government effected by the valve C and the valve L, together with the check-valve I, causes the oil to feed steadily and with great uniformity, while the danger of breakage, especially in the transparent cylinder G, which is so prevalent in those forms of sight-feed lubricators which employ a glass chamber filled with water, is in a large degree prevented.

What I claim is—

1. A sight-feed lubricator consisting of an oil-reservoir, a glass air-tube located at one side thereof, and provided at its upper end with an oil-conduit which extends into the oil-reservoir and terminates adjacent to the top of the same, a valve controlling the flow of condensed water to the reservoir, and an oil-delivery pipe at the bottom of the oil-reservoir, provided with a valve, substantially as described.

2. The combination, in a sight-feed lubricator, of an oil-reservoir, A, provided at the top with a condensing-chamber, B, from which depends a pipe, D, a water-chamber, J, located at the bottom of the oil-reservoir, and provided with a check-valve, I, and a glass air-tube, G, at one side of the reservoir, provided at its upper end with an oil-conduit extending into the reservoir and terminating adjacent to the top thereof, said air-tube connecting at its lower end with the water-chamber, substantially as and for the purpose described.

3. A lubricator consisting of an oil-reservoir and condenser, from which water is fed into the oil-reservoir, a glass air-tube and oil-conduit leading from the top of the oil-chamber into the top of the glass tube, the construction being such that the oil is fed in visible drops down through the tube, and in connection therewith a chamber, J, arranged at the lower portion of the oil-reservoir and connected with the lower end of the air-tube, said water-chamber being adapted to inclose a water-seal, which prevents the backflow of vapor into the glass tube, substantially as described.

4. A lubricator consisting of an oil-reservoir, a condenser, and valve governing the flow of condensed water into the oil-chamber, a glass air-tube and oil-conduit leading from the top of the oil-chamber into the top of the glass tube, and in connection therewith a water-chamber, J, check-valve I, and valve L, substantially as described.

In testimony whereof I sign this specification in the presence of two witnesses.

CHARLES H. PARSHALL, JR.

Witnesses:
N. S. WRIGHT,
A. E. INGLIS.